June 14, 1960  A. G. MONROE  2,940,168
METHOD OF MANUFACTURING A PACKING FOR
GAS/LIQUID CONTACT DEVICES
Filed Sept. 26, 1955

INVENTOR
ADAM G. MONROE
BY
ATTORNEY

United States Patent Office 2,940,168
Patented June 14, 1960

2,940,168
METHOD OF MANUFACTURING A PACKING FOR GAS/LIQUID CONTACT DEVICES

Adam Gregory Monroe, London, England, assignor to The British Oxygen Company Limited, a British company Filed Sept. 26, 1955, Ser. No. 536,688

Claims priority, application Great Britain Sept. 28, 1954

1 Claim. (Cl. 29—419)

This invention relates to gas/liquid contact devices and to a novel type of packing for use therein.

In gas/liquid contact devices, such as distillation columns, in which the contact zone is filled with some form of packing to promote intimate contact between the gas and the liquid, many factors influence the efficiency of the packing.

It is, for example, generally agreed that a uniform packing will give better performance than a random one under similar conditions. A further important factor is that the liquid phase should be uniformly distributed on the column packing elements in the form of a thin and continuous liquid film. This feature is of particular importance in cases where liquid film coefficient is the controlling mass transfer factor. With many types of high efficiency packing at present in use, it is necessary to preflood the packing with liquid in order to ensure the maintenance of the necessary liquid film throughout the packing during subsequent operation.

With regard to the vapour phase transport through the packing, it is desirable that a maximum turbulence should be created without an excessive build up of the pressure drop.

It is further known that the efficiency of the packing diminishes with increase of the liquid load for many of the packings in current use. Ideally, the efficiency should be independent of the liquid load over a wide range.

Another important feature of the packing is its flooding point which should have as high a value as possible since it determines the diameter of the column required for a given duty.

Finally, the cost of the packing is of importance as most existing types of highly efficient packings, for example, Dixon rings, McMahon saddles are relatively costly. Their price is largely affected by the method of manufacturing packing elements of frequently intricate shapes.

It is an object of the present invention to provide a method of manufacturing a gas/liquid contact device having a packing which is uniform, cheap and simple to produce, and which fulfills, as far as possible, the desiderata specified above.

Numerous elements of column packings are known to be made of wire gauze. The usual shapes are open or closed cylinders, saddles, spirals and the like.

It has been found that the use of two thicknesses of gauze assists considerably the uniform distribution of liquid on the column packing elements. The double layer of gauze sets up capillary forces which not only maintain the liquid film within the packing structure but also encourage its spreading throughout the element. By virtue of these capillary forces, the packing of the present invention is practically "self-preflooding" and pre-flooding of the column is unnecessary.

According to the present invention, a packing for a gas/liquid contact device consists of a plurality of superimposed layers, each layer comprising a corrugated ribbon of two thicknesses of woven wire gauze, coiled about a central axis.

In the disclosed form of the invention, the gauze is corrugated transversely and wound into a spiral in such a way that the width of the ribbon is normal to the direction of fluid flow through the device.

While the present invention is particularly useful in the case of distillation columns, it may also be used for the manufacture of any other type of gas/liquid contact device, such as, for example, gas scrubbers.

The invention will now be more particularly described with reference to the accompanying drawings in which.

Figure 1:
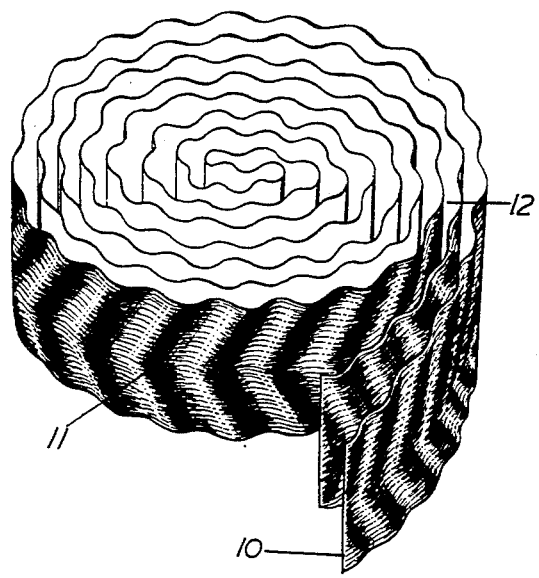
Figure 1 is a perspective view of one form of packing according to the invention.
Figure 2:
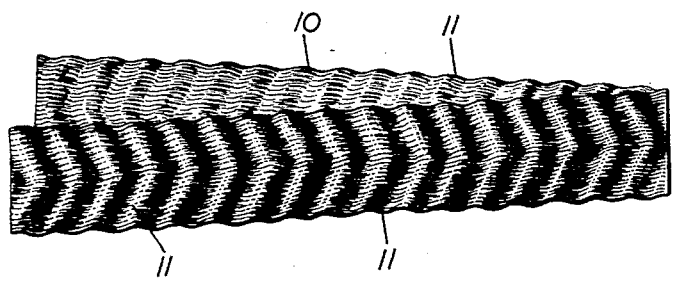
Figure 2 is a perspective view of a gauze strip of the packing of Figure 1 prior to coiling.

Referring to Figures 1 and 2, the basic double gauze ribbon in this form of packing is made by passing a single wire gauze ribbon 10 through a pair of double helical gears of 45° helix angle, so that the ribbon is provided with a series of corrugations 11 at an angle to the width of the ribbon. The ribbon is then doubled on itself as shown in Figure 2 and coiled about a central axis to form a flat cake 12 of the requisite diameter as shown in Figure 2. A series of these cakes 12 are then piled one above the other to fill the packing space of the gas/liquid contact device.

The width of the gauze ribbon 10 and the size of the individual corrugations 11 will vary with the diameter of the device to be packed. A ribbon of 1 inch width is suitable for devices up to 12 inches in diameter.

In experiments using a 4 inch diameter column, with a 1 inch wide gauze ribbon having a corrugation depth of 2.5 mm., peak to peak, at a liquid load of 6000 l./m.$^2$/hr. when separating a 20/80 mol. percent n-heptane/methylcyclohexane mixture, a separating effect of 2.6 plates per foot was achieved, while the flood point was well in excess of 10,000 l./m.$^2$/hr. at total reflux conditions.

In the manufacture of packings according to the present invention, it is preferred to use 100/100 mesh Phosphor bronze gauze, although meshes as large as 40/40 have been successfully used. This is the limiting size below which unsealing of the apertures in the gauze takes place with consequent loss in separating efficiency. The effect of mesh size is not greatly significant so long as the apertures in the gauze are during use at all times sealed with reflux liquid in order to reduce entrainment by maintaining a continuous moving thin film of liquid within the mass exchange area.

I claim:

The method of manufacturing a packing for a gas/liquid contact device which comprises corrugating a ribbon of a single thickness of woven wire gauze, the corrugations being at an angle to the width of the ribbon, folding the corrugated ribbon on itself to form a ribbon of two thicknesses of wire gauze in capillary contact with respect to the liquid being used, coiling the folded ribbon about a central axis with the width of the ribbon substantially parallel thereto to form a packing unit, and superimposing a plurality of such packing units to form the packing, the apertures of said gauze being of capillary size with respect to the liquid being used.

References Cited in the file of this patent

UNITED STATES PATENTS

| | | |
|---|---|---|
| 437,902 | Herder | Oct. 7, 1890 |
| 2,214,672 | Hausen | Sept. 10, 1940 |
| 2,470,652 | Scofield | May 17, 1949 |
| 2,594,585 | Ridgway | Apr. 29, 1952 |
| 2,615,699 | Dixon | Oct. 28, 1952 |
| 2,615,832 | Dixon | Oct. 28, 1952 |

FOREIGN PATENTS

| | | |
|---|---|---|
| 251,331 | Great Britain | Apr. 28, 1926 |
| 359,276 | France | Jan. 16, 1906 |
| 578,309 | Great Britain | June 24, 1946 |
| 596,747 | France | Aug. 14, 1925 |
| 642,068 | Great Britain | Aug. 23, 1950 |